United States Patent
Rydland

(10) Patent No.: US 11,933,146 B2
(45) Date of Patent: Mar. 19, 2024

(54) METHOD AND APPARATUS FOR CREATING A SMALL PRESSURE INCREASE IN A NATURAL GAS STREAM

(71) Applicant: CONOCOPHILLIPS COMPANY, Houston, TX (US)

(72) Inventor: Carl Jonas Rydland, Tananger (NO)

(73) Assignee: CONOCOPHILLIPS COMPANY, Houston, TX (US)

( * ) Notice: Subject to any disclaimer, the term of this patent is extended or adjusted under 35 U.S.C. 154(b) by 212 days.

(21) Appl. No.: 17/469,354

(22) Filed: Sep. 8, 2021

(65) Prior Publication Data
US 2022/0081996 A1 Mar. 17, 2022

Related U.S. Application Data

(60) Provisional application No. 63/078,039, filed on Sep. 14, 2020.

(51) Int. Cl.
| | | |
|---|---|---|
| *E21B 41/00* | (2006.01) | |
| *F01D 1/12* | (2006.01) | |
| *F02C 6/10* | (2006.01) | |

(52) U.S. Cl.
CPC ...... *E21B 41/0085* (2013.01); *E21B 41/0007* (2013.01); *F01D 1/12* (2013.01); *F02C 6/10* (2013.01)

(58) Field of Classification Search
CPC .... E21B 41/0007; E21B 41/0085; F01D 1/12; F05D 2260/601; F02C 6/10
See application file for complete search history.

(56) References Cited

U.S. PATENT DOCUMENTS

| | | | |
|---|---|---|---|
| 2011/0289962 A1 | 12/2011 | Amidei et al. | |
| 2013/0015669 A1* | 1/2013 | Favilli | F03B 13/10 |
| | | | 290/1 R |
| 2014/0318178 A1 | 10/2014 | Del Campo | |
| 2015/0030464 A1 | 1/2015 | Lemaitre et al. | |
| 2021/0033095 A1* | 2/2021 | De Raeve | F04D 31/00 |

FOREIGN PATENT DOCUMENTS

EP 2679766 B1 8/2016

OTHER PUBLICATIONS

International Search Report for PCT/US2021/49425 dated Dec. 23, 2021; 3 pgs.

* cited by examiner

*Primary Examiner* — Paul J Gray
(74) *Attorney, Agent, or Firm* — CONOCOPHILLIPS COMPANY

(57) ABSTRACT

A method of raising the pressure of a natural gas stream (9) on an oil or gas producing installation (1) comprises using an existing high pressure gas stream (13) at the installation to drive the turbine (12) of a turbo-compressor unit (10). It is common on oil and gas producing installations to require the pressure of a gas stream to be increased by a small amount, e.g. to allow flare gas to be fed to the production gas train thereby avoiding flaring. This system may replace the current practice of using ejectors for this purpose since ejectors are very inefficient. However, it can be advantageous to feed the output of the turbine side (12) of the turbo-compressor (10) to an ejector which can give a small pre-boost to the low pressure natural gas (9) before it enters the compressor side (11) of the turbo-compressor (10). (FIG. 2).

12 Claims, 2 Drawing Sheets

METHOD AND APPARATUS FOR CREATING A SMALL PRESSURE INCREASE IN A NATURAL GAS STREAM

CROSS-REFERENCE TO RELATED APPLICATIONS

This application is a non-provisional application which claims benefit under 35 USC § 119(e) to U.S. Provisional Application Ser. No. 63/078,039 filed Sep. 14, 2020 entitled "METHOD AND APPARATUS FOR CREATING A SMALL PRESSURE INCREASE IN A NATURAL GAS STREAM," which is incorporated herein in its entirety.

STATEMENT REGARDING FEDERALLY SPONSORED RESEARCH OR DEVELOPMENT

None.

FIELD OF THE INVENTION

This invention relates to the management of gas streams, such as on oil and gas producing installations, where a small pressure increase is required.

BACKGROUND OF THE INVENTION

In the process of producing hydrocarbons, it is common for low pressure hydrocarbon gas streams to be created, through venting from various equipment, or due to surplus production. A lot of different processes discharge gas at a pressure which is too low for it to be fed to other parts of the gas processing plant, such as expelled gas from dry gas seals in compressors, degassers, water treatment units and other processing units where the pressure of the gas is brought to a lower pressure. Also, gas may sometimes be transferred between installations and a small pressure increase may be required in order to do this. There may also be other circumstances where a natural gas stream needs to have its pressure increased by a small amount and where it may be uneconomical to install a conventional mechanical compressor.

Low pressure gas on an oil and gas production installation, which is normally natural gas and thus mostly methane, may simply be flared if it is not economical to recover it. If possible, however, it is recovered for use. Depending on the circumstances, it may be at atmospheric pressure (1 bar), or it may be at a higher pressure, but still need to have its pressure increased slightly in order to be processed further.

Transferring gas between facilities which operate at slightly different pressures can be an issue, since mechanical compressors are expensive to install and maintain; it may not be economical to transfer the gas to a slightly higher pressure facility where it may be more usefully employed.

Another example is where there are constraints in one area of the production plant operating at one pressure. There it might be beneficial to increase slightly the pressure of the gas stream entering a plant to bypass that part of the plant, and enter into a higher pressure location of the plant, allowing it to go through the plant without adding constraints to an already constrained part of the plant.

Returning to the flare gas recovery scenario, if low pressure gas is to be recovered and not flared, which is an increasingly desirable objective in view of minimizing carbon dioxide emissions, then it needs to be brought up to a usable pressure. For example, to feed the gas into the production train (normally into the production separator) on an oil or gas rig so that it may become part of the production stream from the rig and be sold, the gas may need to be at a pressure of about 12 bar (1.2 MPa). This will vary from rig to rig but is given here as an example of a small pressure increase for which it may not be economical to employ a mechanical compressor powered by electricity or combustible fuel. Instead, a so-called ejector is sometimes used.

An ejector is a device for harnessing the energy from an existing high pressure gas stream to bring a low pressure gas stream up to a usable pressure. Often, a high pressure supply of hydrocarbon gas will be available on a producing hydrocarbon installation, e.g. a gas injection supply or gas lift supply. Therefore, it can make sense to employ the energy from one of these high pressure sources to increase the pressure of the low pressure gas up to a useful pressure.

The ejector works using Bernoulli's principle, passing the high pressure stream through a restriction to accelerate it, reducing the pressure and drawing the low pressure stream into it, to provide a single combined stream at an intermediate pressure. Provided the high and low pressure gas supplies are both of a similar composition, there is no issue combining the streams, but obviously this can be a limitation on the system. A typical structure for an ejector is shown in FIG. 1.

Clearly, using an existing source of pressure can be desirable rather than having the complexity, capital cost, running costs and maintenance costs of a mechanical compressor. Nonetheless, the inventor has calculated that ejectors are not very efficient and a lot of the energy from the high-pressure gas supply may be wasted. Also, because the streams are mixed, an ejector can only be used when mixing the streams is not going to present a problem.

On some installations there is a high pressure supply of natural gas, for example gas that is used for gas injection, that is to say injection of gas via gas injection wells to supplement the pressure in an oil reservoir or field. Currently, it is normal to take some of the pressurized natural gas from the gas injection supply and use this to drive ejectors. A number of other high pressure supplies are also commonly available on oil and gas producing installations, (e.g. offshore rigs), such as gas lift gas or even sales gas, and can potentially be used to drive ejectors, hence the very common use of ejectors which are simple and inexpensive to install and have minimal maintenance requirements.

On one of the applicant's producing rigs in the North Sea, for example, a 250 bar (25 MPa) injection gas supply is used to power ejectors to take natural gas at almost atmospheric pressure up to about 12 bar (1.2 MPa) to allow it to be fed to the production separator. The mechanical compressor for the injection gas supply is in this case powered by burning produced natural gas and it has been calculated that 9,500 $Sm^3$/day of gas may be required as fuel to power the mechanical compressor to provide the pressurized gas to recover 11,000 $Sm^3$/day of low pressure gas ($Sm^3$ means standard cubic meters).

In another example, natural gas from one of the applicant's North Sea fields is processed using a plant on a platform in a neighboring field. Gas coming into the plant is at a pressure suitable only for entering a low pressure separator of the plant, but this separator is overloaded so it is preferable for it to enter an alternative, high pressure, separator in the plant. The required pressure difference is only about 10 bar (1 MPa) and ejectors are used to lift the pressure of the incoming gas so that it instead can be fed to the high pressure separator. It would again be desirable here for the pressure of the incoming gas to be increased in a more efficient way.

The inventor has devised a system and method for providing better efficiency when relatively small pressure increases are required (e.g. where an ejector would normally be used) and where there is a convenient existing supply of relatively high pressure fluid, without the need for installing a mechanical compressor with all the associated costs and complexities.

BRIEF SUMMARY OF THE DISCLOSURE

The invention more particularly includes a method of increasing the pressure of a natural gas stream on a hydrocarbon producing installation by from 1 to 20 bar (0.1 to 2 MPa), optionally from 2 to 15 bar (0.2 to 1.5 MPa) such as from 5 to 15 bar (0.5 to 1.5 MPa), the method including (a) passing the natural gas stream through a compressor housing of a turbo-compressor unit, the unit comprising mechanically connected turbine and compressor impellers in respective housings; and (b) passing a drive fluid at a pressure of 30 to 500 bar (3 to 50 MPa), optionally from 40 to 400 bar (4 to 40 MPa), such as from 50 to 300 bar (5 to 30 MPa) through the turbine housing of the turbo-compressor unit.

The natural gas stream may be passed through an ejector prior to entering the turbo-compressor, the ejector being driven by fluid exiting the turbine side of the turbo-compressor unit. The ejector may raise the pressure of the natural gas stream by, e.g., from 0.1 to 5 bar (0.01 to 0.5 MPa).

The drive fluid may be from an existing pressurized fluid source on the hydrocarbon producing installation. The pressurized fluid source may be selected from (i) a supply of injection gas, (ii) a supply of lift gas, (iii) a supply of sales gas, (iv) a supply of natural gas direct from a producing rock formation, (v) a supply of compressed air, and (vi) a supply of pressurized water. If the pressurized fluid source is either injection gas or lift gas then, in either case, it may have been pressurized by a mechanical compressor unit, e.g. driven by an electric motor or other driver, at the installation. The mechanical compressor unit may commonly be fueled by fuel gas from the installation.

The compressor unit may comprise two or more mechanical compressors or mechanical compressor stages and the higher pressure fluid may be taken from an intermediate mechanical compressor stage.

The method may be used in a flare gas recovery system where the natural gas stream is initially at from 1 to 2 bar (1 to 0.2 MPa) and, after having its pressure increased, is fed to a production train, e.g. production separator, of the hydrocarbon producing installation.

The method may employ apparatus comprising: (a) a turbo-compressor unit, the unit comprising mechanically connected turbine and compressor impellers in respective housings; and (b) an ejector having (i) an outlet in communication with an inlet of the compressor housing of the turbo-compressor unit and (ii) a drive fluid inlet in communication with an outlet of the turbine side of the turbo-compressor unit.

In another aspect of the invention, which may also find application outside the field of oil and gas production, a method of increasing the pressure of a first gas stream (optionally by a pressure increase of from 0.1 to 10 MPa, e.g. from 0.1 to 5 MPa or from 0.1 to 2 MPa) includes (a) passing the first gas stream through a compressor housing of a turbo-compressor unit, the unit comprising mechanically connected turbine and compressor impellers in respective housings; (b) passing a drive fluid at a pressure higher than that of the first gas stream (optionally the entering drive fluid being at a pressure of of 3 to 100 MPa, optionally from 4 to 50 MPa, such as from 5 to 30 MPa) through the turbine housing of the turbo-compressor unit; and (c) passing the first gas stream through an ejector prior to entering the turbo-compressor, the ejector being driven by fluid exiting the turbine side of the turbo-compressor unit. The ejector may, for example raise the pressure of the first gas stream by from 0.01 to 0.5 MPa prior to entering the turbo-compressor.

In another aspect of the invention, which may also find application outside the field oil and gas production, apparatus for increasing the pressure of a gas stream comprises: (a) a turbo-compressor unit, the unit comprising mechanically connected turbine and compressor impellers in respective housings; and (b) an ejector having an outlet in communication with an inlet of the compressor housing of the turbo-compressor unit and an inlet in communication an outlet of the turbine housing of the turbo-compressor. In use, a low pressure gas stream may be fed into an inlet of the ejector to have its pressure raised slightly before entering the turbo-compressor. The turbo-compressor turbine is powered by a high pressure drive fluid, but the drive fluid on exiting the turbine housing is fed into the drive inlet of the ejector. In this way the efficiency of the turbo-compressor can be employed in a situation where it may (i) be desirable to slightly boost the pressure of the gas entering the turbo-compressor, in order to increase the efficiency of the turbo-compressor, and also (ii) be desirable to make use of the energy of the output stream from the turbine of the turbo-compressor and to combine this stream with the low pressure gas stream.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

While preferred examples of the present inventive concept have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein can be employed in practicing the disclosure. It is intended that the following claims define the scope of the disclosure and that methods and structures within the scope of these claims and their equivalents be covered thereby.

Pressure units in this specification are all given as absolute values, i.e. including atmospheric pressure.

The term "mechanical compressor" means a standard type of compressor which is powered by a motor, e.g. fueled by natural gas or electricity. This may involve the production of a dedicated gas stream such as steam to drive a turbine.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
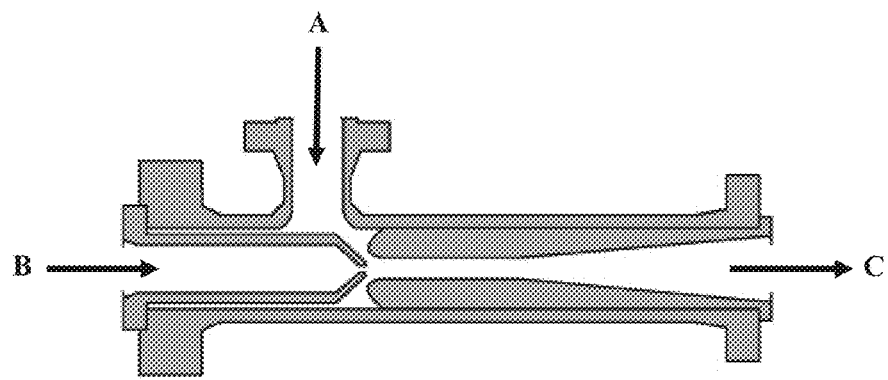
FIG. 1 is a schematic sectional view of a known type of ejector

In FIG. 1, a known type of ejector is shown in cross section. Low pressure gas enters the ejector at A and high pressure gas enters at B. The high pressure gas is passed through a venturi arrangement to increase its speed and reduce its pressure, thereby "sucking" the low pressure gas into the stream. The combined gas stream then expands and exits the ejector at outlet C, at a pressure intermediate that of the low and high pressure streams.

Figure 2:
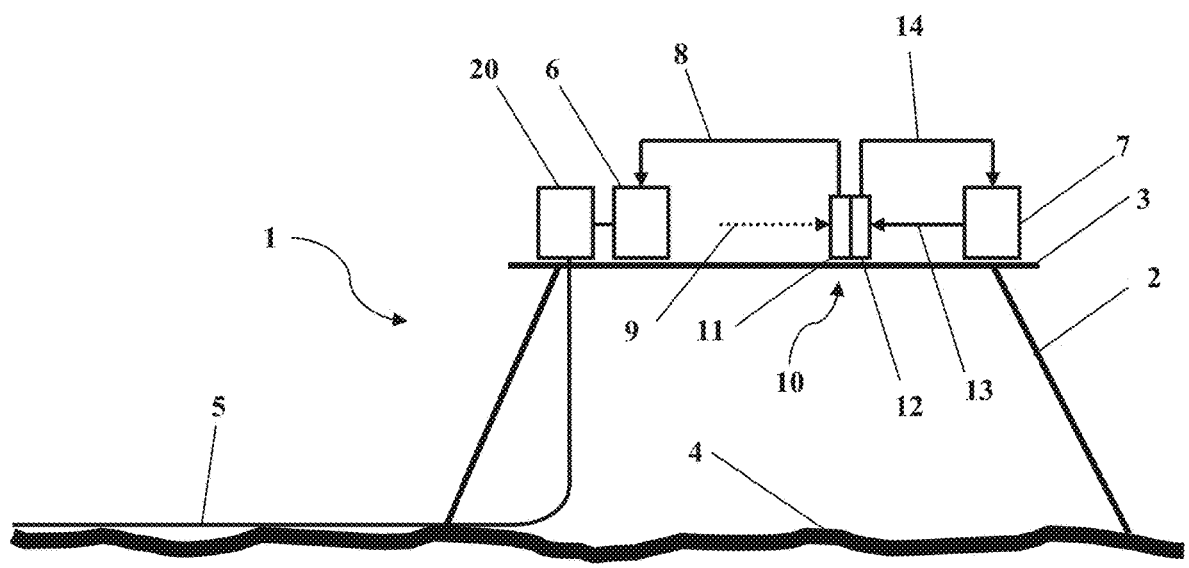
FIG. 2 is a schematic view of a system according to the invention in place on an offshore hydrocarbon producing rig.

FIG. 2 shows an example of the invention in operation on an offshore hydrocarbon producing platform 1, although it should be understood that the invention is not necessarily restricted to offshore rigs but may be applicable in any hydrocarbon production installation. Only those parts relevant for an overall understanding of the invention are shown. The platform 1, as is conventional, comprises a jacket 2 supporting a deck 3 and resting on the seafloor 4. A subsea pipeline 5 carries produced natural gas away from the platform, ultimately for sale. The pipeline runs from a sales gas mechanical compressor 20. The compressor 20 is, in turn, fed from a production separator 6 on the platform deck 3, that separates produced liquid hydrocarbons from natural gas.

Also located on the deck 3 is an injection gas mechanical compressor unit 7. Some produced natural gas is compressed up to about 250 bar (25 MPa) for the purpose of injecting it via injection wells into a subsea hydrocarbon reservoir in order to stimulate production of hydrocarbons. The mechanical compressor unit 7 or the sales gas mechanical compressor 20 or any other mechanical gas compressor on the platform, may in fact comprise a number of separate mechanical compressors (not shown) whereby the injection gas is brought up to a first elevated pressure in a first stage compressor and the pressure of the natural gas increased in steps as it passes through subsequent compressors. Alternatively, the compressor unit may comprise a single mechanical compressor having more than one compressor impeller (which may also be known as a "stage"). In either case, it may be possible to take a gas supply off the compressor unit at an intermediate pressure after, e.g., the first stage, rather than using the final, highest pressure, output from the compressor unit.

The separator 6 is fed with a mixture of produced liquid and gas hydrocarbons; this is conventional and not shown. The separator is also fed, on line 8, with natural gas, which was at low (approximately atmospheric) pressure and would otherwise have been flared but has had its pressure raised sufficiently for it to be combined with the produced gas stream in the separator 6 and then fed into the sales gas mechanical compressor 20 and into the pipeline 5. The low pressure gas from the flare system or other low pressure gas system on line 9 enters the compressor side 11 of a combined turbine and compressor unit 10. For reasons discussed below, in this application the unit will be called a turbo-compressor 10. In the turbo-compressor 10 the low pressure gas has its pressure increased from about atmospheric (1 bar; 1 MPa) to about 12 bar (1.2 MPa).

The turbine side 12 of the turbo-compressor 10 is driven by a high pressure natural gas supply on line 13 from the injection gas compressor 7 (although it could easily be driven from an alternative high pressure gas supply). There are different options for where to direct the outflow 14 from the turbine side 12 of the turbo-compressor 10 and these will be discussed in later paragraphs.

Figure 3:
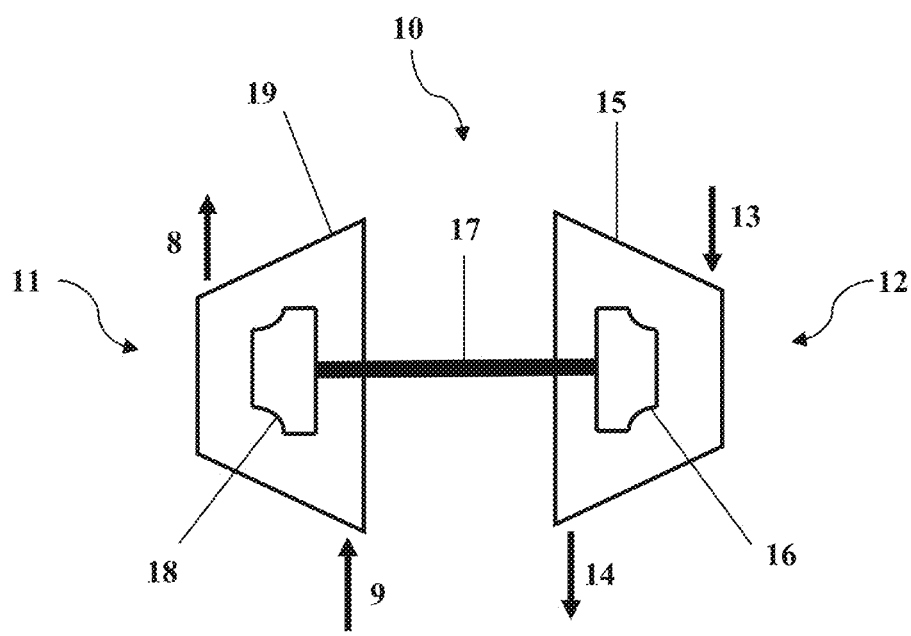
FIG. 3 is a schematic sectional view of a turbo-compressor suitable for use in the invention.

The turbo-compressor 10 is schematically shown, with a little more detail, in FIG. 3. The same reference numerals are used to refer to features common to FIGS. 2 and 3. The turbine side 12 of the turbo-compressor is shown comprising a housing 15 including an inlet for the high pressure natural gas supply 13. The high pressure gas drives a turbine wheel 16, which in turn drives a shaft 17. The shaft 17 is common to the two sides of the turbo-compressor and drives a compressor impeller 18 located in a compressor housing 19. Low pressure natural gas enters the compressor housing at 9 and exits the housing 19 with increased pressure at 8.

In the oil and gas field, a device commonly known as a turboexpander is used in refrigeration for dew point control. When cooling a high pressure gas stream by expansion as part of a refrigeration process, it can make sense to use the mechanical energy provided by the expanding gas and use it for some other purpose, e.g. driving an electrical generator or some other machinery, e.g. a mechanical compressor. The turboexpander comprises a housing through which the gas is passed as its pressure is reduced and it is allowed to expand. Within the expander housing is an expander wheel with turbine-like characteristics which cause it to be rotated by the expanding gas. The rotating shaft may then be used to power e.g. a generator or in some cases the impeller of a mechanical compressor. In the latter case, the fluid in a separate system may be compressed; this arrangement is common in liquid natural gas liquefaction plants.

The so called turbo-compressor to be used in the invention has some similarities to the turboexpander of a liquid natural gas plant, but it is used in a very different way. In a turboexpander, the pressure drop is normally large—in the region of 40 or 50 bar (4-5 MPa) or more. This is necessary to achieve a significant lowering of temperature. However, in the invention it is not desired to reduce the temperature of the high pressure gas and, in fact, a large temperature change could be problematic, e.g. due to condensation of higher molecular weight hydrocarbons in the natural gas mixture. The inventor has appreciated that a device of this type could, however, be used to make relatively small pressure changes to a fluid, e.g. in the region of 10 bar (1 MPa), without affecting the temperature of the driving fluid sufficiently to be a problem.

Since the primary purpose of this unit is to pressurize a low pressure gas supply, the term "turbo-compressor" is used here. The turbo-compressor has similarities with a turbocharger of a car, but since the term "turbocharger" is exclusive to the automotive field, it is not used here.

An alternative source of high pressure gas is the so-called "gas lift" gas. Gas lift is an artificial-lift method in which gas is injected into the production tubing to reduce the hydrostatic pressure of the fluid column. The resulting reduction in bottom hole pressure allows the reservoir liquids to enter the wellbore at a higher flow rate. The gas lift gas is typically conveyed down the tubing-casing annulus and enters the production well through a series of gas-lift valves. A hydrocarbon production installation may have a gas lift compressor unit installed on it to provide pressurized natural gas for this purpose. If gas lift is in use on the installation, then this gas (normally natural gas) would likely be at a high enough pressure to drive a turbo-compressor in the way contemplated in the invention. For example, on one of the applicant's rigs in the North Sea, the gas lift supply is at about 160 bar (16 MPa).

The compressors for injection gas or gas lift may be multi-stage compressors, whereby e.g. a first stage raises the pressure of natural gas to about 45 bar (4.5 MPa) and a subsequent stage or stages raises the gas to its full pressure. Because of the relative efficiency of a turbo-compressor unit in comparison to an ejector, a gas supply at 45 bar (4.5 MPa) may provide sufficient power to a turbo-compressor to raise the pressure of the LP gas to, e.g., 12 bar (1.2 MPa) from roughly atmospheric.

Other sources of high pressure gas may be available on a production installation, e.g. all production installations will have gas leaving the installation to be sold and this will be at an "export pressure" which is normally over 100 bar (10 MPa). This is known as "sales gas". In FIG. 2, the sales gas is compressed in a sales gas compressor shown at 20 on the rig. Even natural gas coming straight from the reservoir, under so called formation pressure, may be suitable. This is particularly true for high pressure, high temperature fields (a.k.a. HPHT fields.)

When a turbo-compressor is used, the high pressure fluid need not be natural gas since the fluids are not mixed. For example, on some platforms operated by the applicant in the Norwegian North Sea, there is a supply of compressed air and also a supply of high pressure water at 300 bar (30 MPa) which could be used to drive the turbine of the turbo-compressor. However, normally the drive fluid would be expected to be high pressure natural gas (predominantly methane). Whatever the drive fluid, the fluid exiting the turbine side of the turbo-compressor needs to be handled. There are a number of options and to some extent the option selected will depend on the pressure drop across the turbine. The output could, for example, if the pressures were suitable, be fed back to the intake of the injection gas compressor (as shown in FIG. 2).

An alternative arrangement would be to combine the turbine output 14 with another gas supply which is at a similar pressure. For example, if the turbine output 14 were natural gas at approximately 160 bar (16 MPa) or higher, then this could be combined with the 160 bar (16 MPa) gas lift supply mentioned earlier. There may also be other gas streams at the production installation with which the turbine output could be incorporated.

Another alternative arrangement, which may be especially suitable if there is no existing gas stream of suitable pressure at the installation, may be to use the turbine output stream as the feed gas (high pressure gas stream) for an ejector. The ejector would provide an initial boost to the pressure of the low pressure gas source before it is routed to the input of the compressor side of the turbo-compressor unit. Thus, referring to FIGS. 1 and 2, the output 14 from the turbine 12 in FIG. 2 would form the high pressure input to the ejector at B in FIG. 1. The low pressure gas would form the input A to the ejector and the output C from the ejector would form the input stream 9 to the compressor 11 of the turbo-compressor 10.

Using this arrangement, the turbine output stream, which may still be at a reasonably high pressure, may be employed more efficiently in certain situations. For example, the turbine output in the example above might be at a pressure of 100 bar (10 MPa). In order not to waste this energy, it may be convenient to use it to boost the pressure of the low pressure gas before it enters the compressor side of the turbo-compressor. This can be especially useful if the low pressure gas is at around atmospheric pressure, since the compressor of the turbo-compressor unit (a centrifugal compressor) may operate more efficiently when the input stream is slightly above atmospheric pressure.

EXAMPLE 1

In a North Sea field operated by the applicant, ejectors are used in the flare gas recovery system. In this system, high pressure gas at 250 bar (25 MPa) from the injection gas system is used to drive an ejector to take atmospheric pressure (0 bar) gas which would otherwise be flared and bring it up to about 12 bar (1.2 MPa) so it can be fed to the production separator. It is estimated that ejectors have an efficiency of about 17%. The ejectors are replaced with turbo-compressors with an efficiency of about 85%.

Recycled gas from the output of the turbine side of the turbo-compressor is fed to an ejector which brings the low pressure input gas stream up to a slightly higher pressure before entering the turbo-compressor.

The efficiency improvement can be quantified in two ways. If one considers the fuel gas required to drive the injection gas compressor, if the saved annual volume of fuel gas were sold this would amount to a saving of USD750,000 per year (including an amount for saved emissions fees/taxes). Alternatively, if one considers the saved fuel gas being used to increase work on the gas lift compressor, this would produce an estimated increase in gross production 200 BOPD (barrels of oil per day) equivalent (approx. 31,800 liters of oil per day equivalent).

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method of increasing the pressure of a natural gas stream on a hydrocarbon producing installation by from 1 to 20 bar, the method being characterized by (a) passing the natural gas stream through a compressor housing of a turbo-compressor unit, the unit comprising mechanically connected turbine and compressor impellers in respective housings; and (b) by passing a drive fluid at a pressure of 30 to 500 bar through the turbine housing of the turbo-compressor unit.

2. The method according to claim 1, wherein the pressure of the natural gas stream is increased by from 2 to 15 bar.

3. The method according to claim 1, wherein the pressure of the natural gas stream is increased by from 5 to 15 bar.

4. The method according to claim 1, wherein the drive fluid is passed through the turbine housing at from 40 to 400 bar.

5. The method according to claim 1, wherein the drive fluid is passed through the turbine housing at from 50 to 300 bar.

6. The method according to claim 1, wherein the natural gas stream is passed through an ejector prior to entering the turbo-compressor, the ejector being driven by fluid exiting the turbine housing of the turbo-compressor unit.

7. The method according to claim 6, wherein the pressure of the natural gas stream is raised by from 0.1 to 5 bar in the ejector prior to entering the turbo-compressor unit.

8. The method according to claim 1 wherein the drive fluid is from an existing pressurized fluid source on the hydrocarbon producing installation.

9. The method according to claim 8 wherein the pressurized fluid source is selected from: (i) a supply of injection gas, (ii) a supply of lift gas, (iii) a supply of sales gas, (iv) a supply of natural gas direct from a producing rock formation, (v) a supply of compressed air, and (vi) a supply of pressurized water.

10. The method according to claim 9, wherein the pressurized fluid source is either injection gas or lift gas and, in either case, is pressurized by a mechanical compressor unit at the installation.

11. The method according to claim 10 wherein the compressor unit comprises two or more mechanical compressors or mechanical compressor stages and the higher pressure fluid is taken from an intermediate mechanical compressor or compressor stage.

12. The method claim 1 in a flare gas recovery system where the natural gas stream is initially at from 1 to 3 bar and, after having its pressure increased, is fed to a production train of the hydrocarbon producing installation.

\* \* \* \* \*